3,002,839
OLIVE PROCESSING
Jerome H. Levinson, Tujunga, and Anthony V. Willmas, Sierra Madre, Calif., assignors to Lawry's Foods, Inc., Los Angeles, Calif., a corporation of California
No Drawing. Filed Apr. 24, 1959, Ser. No. 808,562
3 Claims. (Cl. 99—204)

This invention relates to olive processing, and more particularly to a process by means of which broad new vistas may be opened to the flagging olive growing and processing industry in this Nation.

The olive growing and processing industry in this Nation is currently on the wane, principally because the chief olive product, financially, is olive oil; and processing of olive oil in the United States has become very marginal because of the pressure of foreign competition. At present, there is no major acceptable use for the olive meat, once the oil has been removed, except for cattle feed or the like, and the financial return from this use of the meat is insufficient to take the olive oil processing aspect of the industry out of the marginal region created by foreign competition. It is an object of this invention to provide a process for making an economically valuable product out of the olive meat and at the same time extracting the oil, which thus becomes a very valuable by-product that can compete with foreign olive oils because of the fact that economically valuable products result from both the oil and the meat.

It is another object of this invention to provide a process for treating olives in a way that they may be used as an ingredient in various and sundry food products, such as dips and sauces.

It is another object to provide a high nutrient, very palatable dried olive meat, from which a major portion of high calorie oil has been removed.

It is another object of this invention to provide a process for treating olives which has as a by-product olive oil, which may be then subsequently processed and marketed in conventional manner.

It is another object of this invention to provide a process for treating the meat or pulp of olives so as to produce a dry, easily-preserved product that may be stored for relatively long periods of time without special handling, such as refrigeration, sealing, etc., and which is free from the danger of possible food poisoning through such dreaded media as botulism.

In accordance with these and other objects which will become apparent hereinafter, the olive processing of the present invention will now be described.

The process has been employed successfully with both green and black olives, but it is preferred to employ black, ripe, pitted and chopped olives, which may be either pasteurized or unpasteurized, cooked or uncooked. The chopped olives, now in the form of discrete elements or fragments, are steeped in an acidified brine until the meat is saturated throughout. This generally requires approximately at least eight hours. The brine has a pH between 2.0 and 4.5 and a salinity of between 20° and 45° salometer. The salinity is preferably effected by sodium chloride and the acidification by any food acid such as citric, acetic, phosphoric or lactic. Citric acid is preferred because it has a synergistic effect with the salt to prevent micro-biological spoilage, a higher concentration of acidity per molecule, and is more effective as an anti-oxidant to prevent oxidation of the oils during the remainder of the processing. Empirically, it has been found that citric acid in a weight of 1% of the weight of the drained olives produces the desired pH and is eminently satisfactory for this process. In a preferable commercial embodiment of the process, the citric acid brine has a pH of 3.8 and a salinity of 25° salometer.

After the steepage, the olives may be stored, more or less indefinitely in the brine, until ready for the next step, which is the pressing. To effect this step, the olives are separated from the brine by draining the brine off, and are put on or into press cloths or bags made of an inert material such as nylon, Dacron, cotton, rayon or canvas. The bagged olives are then pressed in a hydraulic press at pressures ranging from 2,000 to 5,000 pounds per square inch for a period of from two minutes to sixty minutes untill the water content is reduced to a range of from 40% to 60%.

In a satisfactory commercial process, the pressing is effected at approximately 3,000 pounds per square inch for a period of approximately ten minutes. The time of pressing will of course depend upon the pressure, and both will ultimately depend upon the amount of moisture to be removed. An optimum amount for commercial purposes is approximately 50%.

The entire process is preferably conducted at room temperatures, but if more oil is desired to be extracted, it may be conducted at elevated temperatures. In the pressing, the aqueous phase is first removed, and then the oil, which as noted before, is more abundant at higher temperatures.

The pressing step produces a tough pad of olive fragments pressed together. The water and oil are drained off, and are in turn separated, following which the olive oil is processed by any suitable and conventional process. The pads are removed from the press and broken up into the original olive fragments that were extant before the pressing operation. This breaking-up is effected in any suitable type of shaker or mixer, preferably a ribbon mixer or blender.

The olive fragments are dried for about 1½ or 2 hours until the moisture content is reduced to from 2 to 12%. This drying is preferably effected by placing the olives in trays and thence in a tunnel dehydrator, although chain, belt, trough, bin, or mechanical dryers as well as sun drying may be used if desired. In an optimum commercial operation, the water content is reduced in the dehydrator to approximately 7%.

After drying, the olives are sprayed with an innocuous anti-oxidant. A suitable such anti-oxidant is a liquid mixture of butylated hydroxytoluene, butylated hydroxyanisole, propyl gallate and citric acid. These components have been found to have valuable synergistic effects and are used in quantities where the active ingredients are less than .01% of the total mixture. In commercial practice, it is desirable to spray the anti-oxidant liquid on the dried olive fragments while they are in a blender or other agitator to insure uniform distribution of the liquid spray over the olives.

Storage of the dried olives may be conveniently effected in foil-lined bags or other air-tight containers, flushed and covered with an atmosphere of nitrogen, carbon dioxide or other inert gas before sealing. In this state they are ready for use in various food products, including, for example, sauces, and dips.

While the instant invention has been shown and described herein in which is conceived to be the most practical and preferred embodiment, it is recognized that departures may be made therefrom within the scope of the invention which is therefore not to be limited to the details disclosed herein but is to be afforded the full scope of the claims.

What is claimed is:
1. Method of processing olives comprising steeping the olives in the form of discrete elements in acidified brine having a pH between 2.0 and 4.5 and a salinity of between 20° and 45° salometer for a period of at least eight hours, said brine being composed of a solution of sodium chloride and a food acid selected from the group consisting of citric, acetic, phosphoric and lactic; draining the brine; subjecting the olives to a pressure of from 2,000 to 5,000 pounds per square inch for a period from 2 minutes to 60 minutes, until the water content is reduced to 40–60%; removing the water and oil thus pressed from the olives, breaking up the olive pad formed by the pressing into the discrete elements which were extant before the pressing operation, dehydrating the olives for a period from 1.5 to 2 hours until the water content is reduced to from 2 to 12%, and spraying the olives with an edible, anti-oxidant liquid.

2. Method in accordance with claim 1 wherein the olives are black ripe olives, pitted and chopped before subjection to steeping.

3. Method in accordance with claim 1 wherein said brine is composed of a solution of sodium chloride and citric acid and has a pH of approximately 3.8 and a salinity of approximately 25 degrees salometer, said pressing is effected at substantially 3,000 pounds per square inch pressure for a period of approximately ten minutes, and said dehydrating is effected until the water content of the olives is approximately 7%.

References Cited in the file of this patent

UNITED STATES PATENTS

| | | |
|---|---|---|
| 1,154,363 | Beresford | Sept. 21, 1915 |
| 2,282,781 | Musher | May 12, 1942 |

OTHER REFERENCES

"Food and Food Products," by Jacobs, volume III, second edition, 1925, pages 2319 and 2320.